US008665815B2

(12) United States Patent
Chun et al.

(10) Patent No.: US 8,665,815 B2
(45) Date of Patent: *Mar. 4, 2014

(54) METHOD FOR QOS GUARANTEES IN A MULTILAYER STRUCTURE

(71) Applicant: LG Electronics Inc., Seoul (KR)

(72) Inventors: Sung Duck Chun, Anyang-si (KR); Young Dae Lee, Anyang-si (KR); Sung Jun Park, Anyang-si (KR); Seung June Yi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/677,111

(22) Filed: Nov. 14, 2012

(65) Prior Publication Data

US 2013/0070714 A1    Mar. 21, 2013

Related U.S. Application Data

(63) Continuation of application No. 13/441,698, filed on Apr. 6, 2012, which is a continuation of application No. 12/452,592, filed as application No. PCT/KR2008/005519 on Sep. 18, 2008.

(60) Provisional application No. 60/973,442, filed on Sep. 18, 2007, provisional application No. 60/976,800, filed on Oct. 2, 2007, provisional application No. 60/983,304, filed on Oct. 29, 2007.

(30) Foreign Application Priority Data

Sep. 17, 2008  (KR) .................. 10-2008-0091192

(51) Int. Cl.
*H04W 4/00* (2009.01)
*H04L 12/56* (2011.01)

(52) U.S. Cl.
CPC ..................... *H04L 47/32* (2013.01)
USPC ........................... 370/329; 370/469

(58) Field of Classification Search
USPC ............................ 370/329, 469; 455/68, 503
See application file for complete search history.

(56) References Cited

U.S. PATENT DOCUMENTS 5,878,041 A    3/1999  Yamanaka et al.
6,445,917 B1   9/2002  Bark et al.
(Continued)

FOREIGN PATENT DOCUMENTS

CN    1314747    9/2001
CN    1339903    3/2002
(Continued)

OTHER PUBLICATIONS

3GPP TS 36.321 V8.2.0 (May 2008), 3rd Generation Partnership Project; Technical Specification Group Radio Access Network; Evolved Universal Terrestrial Radio Access (E-UTRA) Medium Access Control (MAC) protocol specification (Release 8), Jun. 17, 2008.

(Continued)

*Primary Examiner* — Pao Sinkantarakorn
*Assistant Examiner* — Richard K Chang
(74) *Attorney, Agent, or Firm* — McKenna Long & Aldridge LLP

(57) ABSTRACT

A method in which a user equipment processes data in a wireless mobile communication system is provided. The method includes the steps of receiving a first data block from an upper layer, transferring a second data block including the first data block to a lower layer at a particular protocol layer, discarding the first and second data blocks present in the particular protocol layer if a certain period of time has passed, and transferring information associated with the discard of the second data block to the lower layer.

16 Claims, 9 Drawing Sheets

(56) References Cited

U.S. PATENT DOCUMENTS

| | | |
|---|---|---|
| 6,557,135 B1 | 4/2003 | Balachandran et al. |
| 6,594,240 B1 | 7/2003 | Chuah et al. |
| 6,594,244 B1 | 7/2003 | Chang et al. |
| 6,728,918 B1 | 4/2004 | Ikeda et al. |
| 6,738,624 B1 | 5/2004 | Aksentijevic et al. |
| 6,862,450 B2 | 3/2005 | Mikola et al. |
| 6,874,113 B2 | 3/2005 | Chao et al. |
| 6,967,936 B1 | 11/2005 | Laroia et al. |
| 6,987,985 B2 | 1/2006 | Purkayastha et al. |
| 7,009,940 B2 | 3/2006 | Vialen et al. |
| 7,171,163 B2 | 1/2007 | Terry et al. |
| 7,180,885 B2 | 2/2007 | Terry |
| 7,227,857 B2 | 6/2007 | Kuo |
| 7,227,868 B2 | 6/2007 | Inden |
| 7,295,573 B2 | 11/2007 | Yi et al. |
| 7,313,116 B2 | 12/2007 | Lee et al. |
| 7,400,593 B2 | 7/2008 | Choi et al. |
| 7,486,699 B2 | 2/2009 | Yi et al. |
| 7,525,908 B2 | 4/2009 | Olsson et al. |
| 7,706,410 B2 | 4/2010 | Chun et al. |
| 7,710,930 B2 | 5/2010 | Kwak |
| 7,817,595 B2 | 10/2010 | Wu |
| 7,876,771 B2 | 1/2011 | Bergström et al. |
| 7,894,444 B2 | 2/2011 | Lohr et al. |
| 7,978,616 B2 | 7/2011 | Chun et al. |
| 8,027,321 B2 | 9/2011 | Zheng |
| 8,027,363 B2 | 9/2011 | Chun et al. |
| 8,031,689 B2 | 10/2011 | Guo |
| 8,059,597 B2 | 11/2011 | Park et al. |
| 8,081,662 B2 | 12/2011 | Chun et al. |
| 8,130,687 B2 | 3/2012 | Cai et al. |
| 2002/0001314 A1 | 1/2002 | Yi et al. |
| 2002/0009999 A1 | 1/2002 | Lee et al. |
| 2002/0024972 A1 | 2/2002 | Yi et al. |
| 2002/0114280 A1 | 8/2002 | Yi et al. |
| 2002/0122411 A1 | 9/2002 | Zimmerman et al. |
| 2003/0007490 A1 | 1/2003 | Yi et al. |
| 2003/0099305 A1 | 5/2003 | Yi et al. |
| 2003/0194992 A1 | 10/2003 | Kim et al. |
| 2004/0008659 A1 | 1/2004 | Kim |
| 2004/0022213 A1 | 2/2004 | Choi et al. |
| 2004/0076182 A1 | 4/2004 | Wu |
| 2004/0103435 A1 | 5/2004 | Yi et al. |
| 2004/0117860 A1 | 6/2004 | Yi et al. |
| 2004/0146019 A1 | 7/2004 | Kim et al. |
| 2004/0147236 A1 | 7/2004 | Parkvall et al. |
| 2004/0148396 A1 | 7/2004 | Meyer et al. |
| 2004/0153852 A1 | 8/2004 | Wu |
| 2004/0156330 A1 | 8/2004 | Yi et al. |
| 2004/0184438 A1 | 9/2004 | Terry |
| 2004/0208160 A1 | 10/2004 | Petrovic et al. |
| 2004/0229626 A1 | 11/2004 | Yi et al. |
| 2004/0235447 A1 | 11/2004 | Gronberg et al. |
| 2005/0020260 A1 | 1/2005 | Jeong et al. |
| 2005/0026597 A1 | 2/2005 | Kim et al. |
| 2005/0039101 A1 | 2/2005 | Torsner |
| 2005/0041663 A1 | 2/2005 | Jiang |
| 2005/0041681 A1 | 2/2005 | Lee et al. |
| 2005/0042987 A1 | 2/2005 | Lee et al. |
| 2005/0047416 A1 | 3/2005 | Heo et al. |
| 2005/0054365 A1 | 3/2005 | Ahn et al. |
| 2005/0063347 A1 | 3/2005 | Sarkkinen et al. |
| 2005/0083943 A1 | 4/2005 | Lee et al. |
| 2005/0094596 A1 | 5/2005 | Pietraski et al. |
| 2005/0096017 A1 | 5/2005 | Kim et al. |
| 2005/0100048 A1 | 5/2005 | Chun et al. |
| 2005/0105499 A1 | 5/2005 | Shinozaki et al. |
| 2005/0118992 A1 | 6/2005 | Jeong et al. |
| 2005/0147040 A1 | 7/2005 | Vayanos et al. |
| 2005/0164683 A1 | 7/2005 | Roberts et al. |
| 2005/0169293 A1 | 8/2005 | Zhang et al. |
| 2005/0192021 A1 | 9/2005 | Lee et al. |
| 2005/0193309 A1* | 9/2005 | Grilli et al. .................. 714/752 |
| 2005/0201354 A1 | 9/2005 | Hosaka et al. |
| 2005/0213605 A1 | 9/2005 | Kim et al. |
| 2005/0237932 A1 | 10/2005 | Liu |
| 2005/0237960 A1 | 10/2005 | Kim |
| 2005/0238051 A1* | 10/2005 | Yi et al. .................. 370/469 |
| 2005/0250526 A1 | 11/2005 | Lindoff et al. |
| 2005/0254467 A1 | 11/2005 | Li et al. |
| 2005/0259662 A1 | 11/2005 | Kim et al. |
| 2005/0286483 A1 | 12/2005 | Lee et al. |
| 2005/0287957 A1 | 12/2005 | Lee et al. |
| 2006/0007886 A1 | 1/2006 | Lee et al. |
| 2006/0056441 A1 | 3/2006 | Jiang |
| 2006/0067238 A1 | 3/2006 | Olsson |
| 2006/0067289 A1 | 3/2006 | Lee et al. |
| 2006/0067364 A1 | 3/2006 | Jung et al. |
| 2006/0072494 A1 | 4/2006 | Matusz |
| 2006/0072503 A1 | 4/2006 | Kim et al. |
| 2006/0084389 A1 | 4/2006 | Beale et al. |
| 2006/0092972 A1 | 5/2006 | Petrovic et al. |
| 2006/0098574 A1 | 5/2006 | Yi et al. |
| 2006/0128312 A1 | 6/2006 | Declerck et al. |
| 2006/0142020 A1 | 6/2006 | Mueckenheim et al. |
| 2006/0154603 A1 | 7/2006 | Sachs et al. |
| 2006/0154680 A1 | 7/2006 | Kroth et al. |
| 2006/0165045 A1 | 7/2006 | Kim et al. |
| 2006/0182065 A1 | 8/2006 | Petrovic et al. |
| 2006/0203780 A1 | 9/2006 | Terry |
| 2006/0233200 A1 | 10/2006 | Fifield et al. |
| 2006/0251027 A1 | 11/2006 | Chun et al. |
| 2006/0251105 A1 | 11/2006 | Kim et al. |
| 2006/0264179 A1 | 11/2006 | Bonneville et al. |
| 2006/0268798 A1 | 11/2006 | Kim et al. |
| 2006/0274690 A1 | 12/2006 | Chun et al. |
| 2006/0280145 A1 | 12/2006 | Revel et al. |
| 2007/0041397 A1 | 2/2007 | Hwang |
| 2007/0047493 A1 | 3/2007 | Park et al. |
| 2007/0053309 A1 | 3/2007 | Poojary et al. |
| 2007/0060139 A1 | 3/2007 | Kim et al. |
| 2007/0079207 A1 | 4/2007 | Seidel et al. |
| 2007/0081468 A1 | 4/2007 | Timus et al. |
| 2007/0081513 A1 | 4/2007 | Torsner |
| 2007/0091810 A1 | 4/2007 | Kim et al. |
| 2007/0097913 A1 | 5/2007 | Hanov |
| 2007/0117579 A1 | 5/2007 | Cai et al. |
| 2007/0133456 A1 | 6/2007 | Ding |
| 2007/0177628 A1 | 8/2007 | Choi et al. |
| 2007/0183358 A1 | 8/2007 | Cai |
| 2007/0189205 A1 | 8/2007 | Terry et al. |
| 2007/0201397 A1 | 8/2007 | Zhang |
| 2007/0206530 A1 | 9/2007 | Lee et al. |
| 2007/0223526 A1 | 9/2007 | Jiang |
| 2007/0258591 A1 | 11/2007 | Terry et al. |
| 2007/0268861 A1 | 11/2007 | Diachina et al. |
| 2007/0274278 A1 | 11/2007 | Choi et al. |
| 2007/0287440 A1 | 12/2007 | Benkert et al. |
| 2007/0297360 A1 | 12/2007 | Joachim et al. |
| 2007/0297367 A1 | 12/2007 | Wang et al. |
| 2008/0008152 A1 | 1/2008 | Lohr et al. |
| 2008/0043658 A1 | 2/2008 | Worrall |
| 2008/0043670 A1 | 2/2008 | Marinier |
| 2008/0051098 A1 | 2/2008 | Rao |
| 2008/0059859 A1 | 3/2008 | Marinier et al. |
| 2008/0069108 A1 | 3/2008 | Yi et al. |
| 2008/0081598 A1 | 4/2008 | Chandra et al. |
| 2008/0084851 A1 | 4/2008 | Kim et al. |
| 2008/0089285 A1 | 4/2008 | Pirskanen et al. |
| 2008/0101609 A1 | 5/2008 | Jiang |
| 2008/0146242 A1 | 6/2008 | Alanara et al. |
| 2008/0165717 A1 | 7/2008 | Chen et al. |
| 2008/0165755 A1 | 7/2008 | Marinier et al. |
| 2008/0182609 A1 | 7/2008 | Somasundaram et al. |
| 2008/0186936 A1 | 8/2008 | Chun et al. |
| 2008/0186944 A1 | 8/2008 | Suzuki et al. |
| 2008/0186946 A1 | 8/2008 | Marinier et al. |
| 2008/0198869 A1 | 8/2008 | Jiang |
| 2008/0212561 A1 | 9/2008 | Pani et al. |
| 2008/0232396 A1 | 9/2008 | Buckley et al. |
| 2008/0233940 A1 | 9/2008 | Jen |
| 2008/0233941 A1 | 9/2008 | Jen |
| 2008/0268878 A1 | 10/2008 | Wang et al. |
| 2008/0273482 A1 | 11/2008 | Lee et al. |

(56) References Cited

U.S. PATENT DOCUMENTS

| | | |
|---|---|---|
| 2008/0273610 A1 | 11/2008 | Malladi et al. |
| 2008/0310395 A1 | 12/2008 | Kashima |
| 2008/0318578 A1 | 12/2008 | Worrall |
| 2009/0005058 A1 | 1/2009 | Kazmi et al. |
| 2009/0016301 A1 | 1/2009 | Sammour et al. |
| 2009/0041240 A1 | 2/2009 | Parkvall et al. |
| 2009/0046631 A1 | 2/2009 | Meylan et al. |
| 2009/0046667 A1 | 2/2009 | Pelletier et al. |
| 2009/0046695 A1 | 2/2009 | Jiang |
| 2009/0104890 A1 | 4/2009 | Wang et al. |
| 2009/0116434 A1 | 5/2009 | Lohr et al. |
| 2009/0156194 A1 | 6/2009 | Meylan |
| 2009/0175163 A1 | 7/2009 | Sammour et al. |
| 2009/0175253 A1 | 7/2009 | Wu et al. |
| 2009/0232076 A1 | 9/2009 | Kuo |
| 2009/0259908 A1 | 10/2009 | Gollapudi |
| 2010/0014466 A1 | 1/2010 | Meyer et al. |
| 2010/0128648 A1 | 5/2010 | Lee et al. |
| 2010/0142457 A1 | 6/2010 | Chun et al. |
| 2010/0232335 A1 | 9/2010 | Lee et al. |
| 2010/0260140 A1 | 10/2010 | Zhu |
| 2011/0019604 A1 | 1/2011 | Chun et al. |
| 2011/0033048 A1 | 2/2011 | Stanwood et al. |

FOREIGN PATENT DOCUMENTS

| | | |
|---|---|---|
| CN | 1349360 A | 5/2002 |
| CN | 1390425 | 1/2003 |
| CN | 1396780 | 2/2003 |
| CN | 1549610 | 11/2004 |
| CN | 1613210 | 5/2005 |
| CN | 1642067 | 7/2005 |
| CN | 1761260 | 4/2006 |
| CN | 1761356 | 4/2006 |
| CN | 1792048 | 6/2006 |
| CN | 1846365 | 10/2006 |
| CN | 1868157 | 11/2006 |
| CN | 1918825 | 2/2007 |
| CN | 1938969 | 3/2007 |
| CN | 1954521 | 4/2007 |
| CN | 1997227 | 7/2007 |
| CN | 101090281 | 12/2007 |
| EP | 1263160 | 12/2002 |
| EP | 1326397 | 7/2003 |
| EP | 1 343 267 | 9/2003 |
| EP | 1 508 992 | 2/2005 |
| EP | 1 509 011 A2 | 2/2005 |
| EP | 1638237 | 3/2006 |
| EP | 1 689 130 | 8/2006 |
| EP | 1 695 462 A1 | 8/2006 |
| EP | 1 746 855 | 1/2007 |
| EP | 1 768 297 | 3/2007 |
| EP | 1 796 405 | 6/2007 |
| EP | 2026523 | 2/2009 |
| EP | 2108223 | 2/2009 |
| JP | 06-053921 A | 2/1994 |
| JP | 07-162948 | 6/1995 |
| JP | 2000-324161 | 11/2000 |
| JP | 2001-197021 | 7/2001 |
| JP | 2003-516021 | 7/2001 |
| JP | 2002-198895 A | 7/2002 |
| JP | 2003-018050 | 1/2003 |
| JP | 2003-115796 | 4/2003 |
| JP | 2003-115876 | 4/2003 |
| JP | 2003-229925 | 8/2003 |
| JP | 2003-283592 | 10/2003 |
| JP | 2005-073276 A | 3/2005 |
| JP | 2006-054718 | 2/2006 |
| JP | 2006-505209 | 2/2006 |
| JP | 2006-514466 | 4/2006 |
| JP | 2006-121562 A | 5/2006 |
| JP | 2006-311543 | 11/2006 |
| JP | 2007-116639 | 5/2007 |
| JP | 2007-312244 A | 11/2007 |
| JP | 2008-520125 A | 6/2008 |
| JP | 2009-513058 | 3/2009 |
| JP | 2009-521893 | 6/2009 |
| JP | 2010-518683 A | 5/2010 |
| KR | 10-2001-0045783 | 6/2001 |
| KR | 10-2001-0062306 | 7/2001 |
| KR | 10-2002-0004645 | 1/2002 |
| KR | 10-2003-0012048 | 2/2002 |
| KR | 10-2002-0097304 | 12/2002 |
| KR | 10-2003-0060055 | 7/2003 |
| KR | 10-2003-0068743 | 8/2003 |
| KR | 10-2003-0087914 A | 11/2003 |
| KR | 10-2004-0034398 | 4/2004 |
| KR | 10-2004-0039944 | 5/2004 |
| KR | 10-2004-0072961 | 8/2004 |
| KR | 10-2005-0022988 | 3/2005 |
| KR | 10-2005-0062359 | 6/2005 |
| KR | 10-2005-0081836 | 8/2005 |
| KR | 10-2005-0092874 | 9/2005 |
| KR | 10-2005-0099472 | 10/2005 |
| KR | 10-2005-0100882 | 10/2005 |
| KR | 10-2005-0103127 A | 10/2005 |
| KR | 10-2006-0004935 | 1/2006 |
| KR | 10-2006-0014910 | 2/2006 |
| KR | 10-2006-0029452 A | 4/2006 |
| KR | 10-2006-0042858 | 5/2006 |
| KR | 10-2006-0069378 | 6/2006 |
| KR | 10-2006-0079784 | 7/2006 |
| KR | 10-2006-0090191 | 8/2006 |
| KR | 10-2006-0134058 | 12/2006 |
| KR | 10-2007-0048552 | 5/2007 |
| KR | 10-2007-0076374 A | 7/2007 |
| KR | 10-2009-0027157 | 3/2009 |
| KR | 10-2009-0084756 | 8/2009 |
| RU | 229 1594 C2 | 1/2007 |
| RU | 2304348 | 8/2007 |
| TW | 496058 | 7/2002 |
| WO | WO 01/37473 | 5/2001 |
| WO | WO 01/39386 A1 | 5/2001 |
| WO | 01/67664 A2 | 9/2001 |
| WO | 02/45453 A1 | 6/2002 |
| WO | WO 03/045103 | 5/2003 |
| WO | WO 2004/042953 A1 | 5/2004 |
| WO | WO 2004/042963 | 5/2004 |
| WO | WO2004/102838 | 11/2004 |
| WO | WO 2005/022814 A1 | 3/2005 |
| WO | WO 2005/039108 | 4/2005 |
| WO | WO 2005/078967 A1 | 8/2005 |
| WO | WO2005/109671 | 11/2005 |
| WO | WO 2005/122441 A1 | 12/2005 |
| WO | WO 2005/125226 | 12/2005 |
| WO | WO 2006/009714 | 1/2006 |
| WO | WO 2006/016785 | 2/2006 |
| WO | WO 2006/033521 | 3/2006 |
| WO | WO 2006/046894 | 5/2006 |
| WO | WO 2006/052086 | 5/2006 |
| WO | WO 2006/075820 A1 | 7/2006 |
| WO | WO 2006/083149 | 8/2006 |
| WO | WO 2006/095385 | 9/2006 |
| WO | WO 2006/104335 | 10/2006 |
| WO | WO 2006/104342 | 10/2006 |
| WO | WO 2006/104773 A1 | 10/2006 |
| WO | WO 2006/116620 | 11/2006 |
| WO | WO 2006/118418 | 11/2006 |
| WO | WO 2006/118435 | 11/2006 |
| WO | WO 2007/020070 | 2/2007 |
| WO | WO 2007/023364 | 3/2007 |
| WO | WO 2007/024065 | 3/2007 |
| WO | WO 2007/039023 | 4/2007 |
| WO | WO 2007/045505 | 4/2007 |
| WO | WO 2007/052900 | 5/2007 |
| WO | WO 2007/052921 | 5/2007 |
| WO | WO 2007/066900 | 6/2007 |
| WO | WO 2007/078142 | 7/2007 |
| WO | WO 2007/078156 A2 | 7/2007 |
| WO | WO 2007/078164 | 7/2007 |
| WO | WO 2007/078173 | 7/2007 |
| WO | WO 2007/078174 A1 | 7/2007 |
| WO | WO 2007/079085 | 7/2007 |

(56) References Cited

FOREIGN PATENT DOCUMENTS

| WO | WO 2007/089797 |  | 8/2007 |
|----|----|----|----|
| WO | WO 2007/091831 | A2 | 8/2007 |
| WO | WO 2007/126793 |  | 11/2007 |
| WO | WO 2007-078174 | A1 | 12/2007 |
| WO | WO 2007/147431 |  | 12/2007 |
| WO | WO 2008/004725 | A1 | 1/2008 |
| WO | WO 2008/010063 |  | 1/2008 |
| WO |       2008/094120 | A1 | 8/2008 |
| WO | WO 2008/094120 |  | 8/2008 |
| WO | WO 2009/035301 |  | 3/2009 |

OTHER PUBLICATIONS

3GPP TSG-RAN WG2 Meeting #67, Shenzen, China, Aug. 24-28, 2009, R2-095152.
NTT DoCoMo Inc., "Uplink synchronization maintenance", 3GPP TSG RAN WG2 #58, May 7-11, 2007, Kobe, Japan, R2-072014.
Qualcomm Europe, General Corrections to RLC, R2-011701, 3GPP, Jul. 13, 2001.
LG Electronics Inc, Out-of-sequence problem in AM RLC: Discretely discarded SDUs, R2-011206, 3GPP, May 25, 2001.
Ghosh et al., "Random Access Design for UMTS Air-Interface Evolution", Vehicular Technology Conference, Apr. 2007, pp. 1041-1045.
"Correction to PDCP Status Report", 3GPP TSG RAN WG2 #61bis, Mar. 24, 2008, R2-081594, XP-002624627.
"Digital Cellular telecommunications system (Phase 2+); Functional stage 2 description of Location Services (LSC) in Geran (3GPP TS 43.059 version 7.3.0 Release 7); ETSI TS 143 059", May 1, 2007, XP014038519.
"MAC Rapporteurs, Change Request: E-UTRA MAC protocol specification update", 3GPP TSG RAN WG2 #60bis, Sevilla, Spain, Jan. 14-18, 2008, R2-080631.
3GPP TS 25.321 Medium Access Control protocol specification, 3GPP TS25.321 v7.5.0, Jun. 2007.
3GPP TS 36.321 E-UTRA MAC protocol specification, 3GPP TS 36.321 v1.0.0, Sep. 2007 RP-070689.
3GPP TS 36.322, V8.0.0, Dec. 2007, $3^{rd}$ Generation Partnership Project; Technical Specification Group Radio Access Network; Evolved Universal Terrestrial Radio Access (E-UTRA) Radio Link Control (RLC) protocol specification (Release 8).
3GPP TSG RAN WG2 #59bis LTE User Plane session report, 3GPP R2-074536, Oct. 12, 2007.
$3^{rd}$ Generation Partnership Project: "Technical Specification Group Radio Access Network, Evolved Universal terrestrial Radio Access (E-UTRA), Packet Data Convergence Protocol (PDCP) specification (Release 8)", 3GPP TS 36.323 V8.2.1, May 2008.
Abeta et al., "Super 3G Technology Trends. Part 2: Research on Super 3G Technology", NTT Docomo Technical Journal, vol. 8, No. 3, Dec. 2006, pp. 55-62.
Alcatel-Lucent, "Format for RACH Message 2", 3GPP TSG RAN WG2 #60bis, Sevilla, Spain, Jan. 14-18, 2008, R2-080176.
Alcatel-Lucent: "PDCP status report carrying LIS only", 3GPP TSG RAN WG2 #61, Jan. 14-18, 2008, Sevilla, Spain, XP-50138711.
ASUSTek, "On-line recovery of HFN synchronization due to RLC UM SN problem", 3GPP TSG-RAN WG2 Meeting #44 R2-041940, Oct. 2004.
ASUSTek, "Summary of HFN de-synchronization problem off-line email discussion", 3GP TSG RAN WG2 #46 Tdoc R2-050318, Feb. 2005.
Catt, Ritt, "Consideration on UL Buffer Reporting", 3GPP TSG-RAN WG2 #55, R2-062935, Oct. 2006.
Change Request, Miscellaneous corrections to TS 36.322, 3GPP TSG-RAN2 Meeting #61, Shenzhen, China, Mar. 31-Apr. 4, 2008, R2-081700.
Ericsson, "RLC status report format", TSG-RAN WG2 Meeting #60, Jeju Island, Korea, Nov. 5-9, 2007, R2-074701.
Ericsson: "Scheduling Request in E-UTRAN"; Sorrento, Italy; Jan. 2007.
Ericsson: "Clarification to the handling of large RLC status reports", Change Request, 3GPP TSG-RAN2 Meeting #61bis, Shenzhen, China, Mar. 31-Apr. 4, 2008, R2-082018.
Ericsson: "SDU discard", 3GPP, Aug. 24, 2007, R2-073230.
ETSI, "Universal Mobile Telecommunications System (UMTS); Radio Link Control (RLC) protocol specification" 3GPP TS 25.322 version 4.10.0 Release 4), Sep. 2003.
Itri, "Buffer Status Reporting with Group Combining for LTE", 3GPP TSG-RAN WG2, Meeting #58bis, Orlando, Florida, Jun. 25-29, 2007, R2-072833.
Jiang, ASUSTeK Computer Inc., "HFN de-synchronization detection with integrity protection scheme in a wireless communications system", U.S. Appl. No. 60/863,800, filed Oct. 2006.
LG Electronics et al. "ACK_SN setting for short Status PDU", 3GPP TSG-RAN WG2 #62, May 5-9, 2008, Kansas City, Missouri, R2-082133.
LG Electronics Inc. "Correction of status report coding", 3GPP TSG RAN WG2 #61, Feb. 11-15, 2008, Sorrento, Italy, XP-002624626.
LG Electronics Inc. "Correction to Polling Procedure", 3GPP TSG-RAN WG2, #61 bis, Mar. 31-Apr. 4, 2008, Shenzhen, China, R2-081588.
LG Electronics Inc: "UE State Transition in LTE_Active", 3 GPP TSG-RAN WG2 #52; Athens, Greece; Mar. 2006.
LG Electronics, "Delivery of LTE System Information", 3GPP TSG-RAN WG2 Ad Hoc Meeting on LTE, R2-061959, Jun. 2006.
LG Electronics, "Update of eUtran PDCP specification", 3GPP TSG-RAN2 Meeting #61, Sorrento, Italy, 2008, R2-081390.
Motorola, "Design of backoff scheme for LTE", 3GPP TSG-RAN-WG2 Meeting #56 bis, Sorrento, Italy, Jan. 15-19, 2007, R2-070143.
Motorola, "MAC Header format", 3GPP TSF RAN2, Meeting #59bis, Oct. 8-12, 2007, R-2074419.
Motorola: "Contention-Free Intra-LTE Handover"; St. Louis, USA; Feb. 2007.
NEC, "Considerations on Scheduling Information", 3GPP TSG RAN WG2#59, Athens, Greece, Aug. 20-24, 2007, R2-073556.
NEC, "Optimised buffer status reporting", 3GPP TSG-RAN WG2 #58bis, R2-072515, Jun. 2007.
Nokia Siemens Networks: "Update on Security, System Information, Mobility, MAMS and DRX", 3GPP TSG-RAN2 Meeting #59, Aug. 31, 2007, R2-073863.
Nokia, "System Information Distrubution", 3GPP TSG-RAN WG2 Ad Hoc Meeting on LTE, R2-061487, Jun. 2006.
NTT DoCoMo et al. "MAC PDU structure for LTE", 3GPP TSG RAN WG2 #59 bis, Oct. 8-12, 2007, R2-074174.
NTT DoCoMo, Inc. "Buffer Status Report and Scheduling Request triggers", 3GPP TSG RAN WG2 #59, Aug. 20-24, 2007, Athens, Greece, R2-072574.
Qualcomm Europe, "UL Requests", 3GPP TSG-RAN WG1 #47bis, Jan. 15-19, 2007, Sorrento, Italy, R1-070426.
Qualcomm Europe: "Further Details on RACH Procedure", 3GPP TSG-RAN WG1 #48, Feb. 12-16, 2007, St. Louis, Missouri, R1-070649.
Qualcomm Europe: "Scheduling request mechanism", 3GPP TSG-RAN WG1 #48bis, Mar. 30, 2007, R1-071276.
R1-063046; Motolola, "Syncronized Random Access Channel and Scheduling Request", Nov. 6-10, 2006, 3GPP TSG RAN1 #47.
R1-063301; NTT DoCoMo, Fujitsu, Mitsubishi Electric, NEC, Sharp, Toshiba Corporation, "Scheduling Request Transmission Method for E-UTRA Uplink", Nov. 6-10, 2006, 3GPP TSG RAN WG1 Meeting #47.
R2-062350; Ericsson, "Basic Principles for the Scheduling Request in LTE", Aug. 28-Sep. 1, 2006, 3GPP TSG RAN WG2 #54.
R2-074691; Ericsson, Nokia Corporation, Nokia Siemens Networks, Qualcomm Europe, Samsung, NTT DoCoMo, Inc. "Framework for Scheduling Request and Buffer Status reporting", Nov. 5-9, 2007, TSG-RAN WG2 Meeting #60.
Reuven Cohen: "An Improved Sscop-like Scheme for Avoiding Unnecessary Retransmissions and Achieving Ideal Throughput", Conference on Computer Communications, Fifteenth Annual Joint conference of the IEEE computer and communications societies, Mar. 24-28, 1996, vol. 2, pp. 855-862, XP010158150.

(56) References Cited

OTHER PUBLICATIONS

Sammour et al., U.S. Appl. No. 61/019,058, filed Jan. 4, 2008, Method and Apparatus of Performing Packet Data Convergence Protocol Reset.
Texas Instruments: "UL Synchronization Management and Maintenance in E-UTRA"; Kobe, Japan; May 2007.
Texas Instruments: "UL Synchronization Management in LTE_Active"; St. Julians, Malta; Mar. 2007.
Texas Instruments: "Scheduling Request and DRX in E-UTRA", 3GPP TSG RAN WG1 #49bis, Jun. 29, 2007, R1-072859.
Wang et al., U.S. Appl. No. 60/976,139, filed Sep. 28, 2007, Operation of Control Protocol Data Units in Packet Data Convergence Protocol.
ZTE: "Redundant retransmission restraint in RLC-AM" 3GPP Draft R2-061234, May 3, 2006, XP050131180.
Qualcomm Europe, L2 improvements and polling, 3GPP TSG-RAN WG2 Meeting #58 R2-072021, May 11, 2007.
$3^{rd}$ Generation Partnership Project; Technical Specification Group Radio Access Network; Radio Link Control (RLC) protocol specification (release 7), 3GPP Standard, 3GPP TS 25.322, $3^{rd}$ Generation Partnership Project (3GPP), Mobile Competence Centre; 650, Route Des Lucioles; F-06921 Sophia-Antipolis Cedex; France, No. V7.3.0, Jun. 1, 2007 pp. 1-81.
"Universal Mobile Telecommunications System (UMTS); Radio Resource Control (RRC) protocol specification"; (3GPP TS 25.331 version 6.6.0 Release 6); France; 2005-2006.

\* cited by examiner

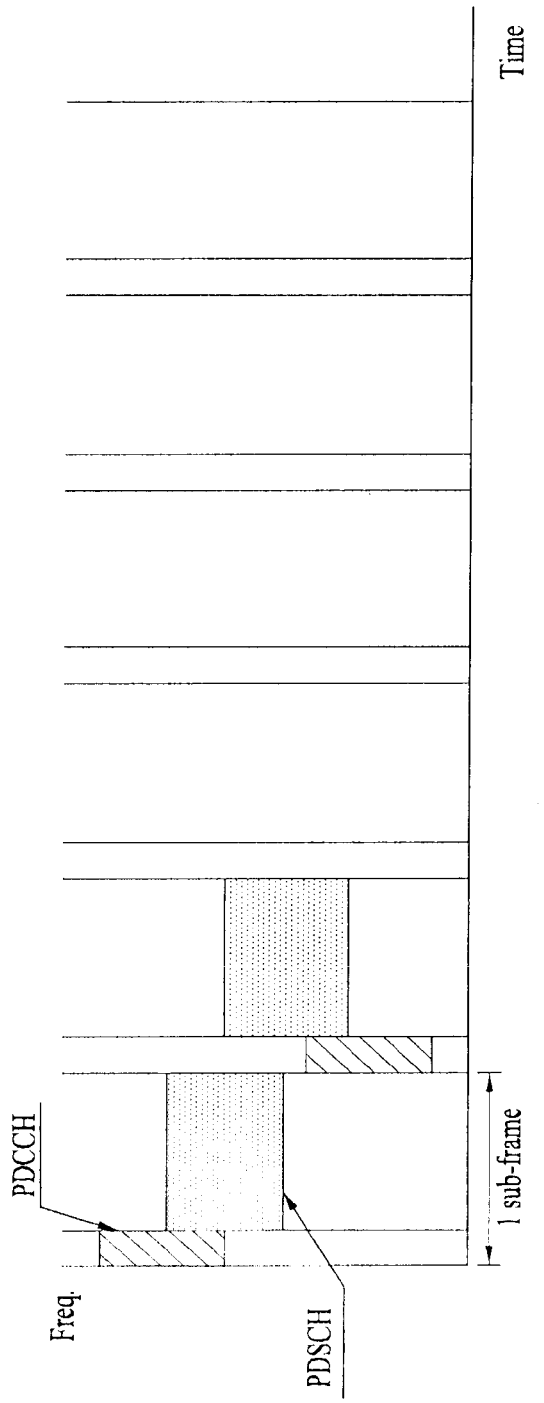

METHOD FOR QOS GUARANTEES IN A MULTILAYER STRUCTURE

This application is a Continuation of, and claims the benefit of, U.S. Application No. 13/441,698, filed Apr. 6, 2012, which is a Continuation of U.S. application Ser. No. 12/452,592, filed Jan. 11, 2010, which is a 35 U.S.C. §371 National Stage entry of International Application No. PCT/KR2008/005519, filed on Sep. 18, 2008, and claims priority to U.S. Provisional Application No. 60/973,442, filed on Sep. 18, 2007, U.S. Provisional Application No. 60/976,800, filed on Oct. 2, 2007, U.S. Provisional Application No. 60/983,304, filed on Oct. 29, 2007 and Korean Patent Application No. 10-2008-0091192, filed on Sep. 17, 2008, all of which are hereby incorporated by reference in their entireties as if fully set forth herein.

TECHNICAL FIELD

The present invention relates to a wireless mobile communication system, and more particularly, to a method in which a terminal (or user equipment) processes data in a wireless mobile communication system.

BACKGROUND ART

A radio protocol based on the 3rd Generation Partnership Project (3GPP) radio access network standard is divided into a first (L1) layer, a second (L2) layer, and a third (L3) layer based on the lower three layers of the Open System Interconnection (OSI) reference model. The second layer of the radio protocol includes a Medium Access Control (MAC) layer, a Radio Link Control (RLC) layer and a Packet Data Convergence Protocol (PDCP) layer. The third layer includes a Radio Resource Control (RRC) layer at the bottom of the third layer.

The RLC layer is responsible for guaranteeing Quality of Service (QoS) of each Radio Bearer (RB) and performing data transmission according to the QoS. The RLC layer includes one or two RLC entities for each RB in order to guarantee QoS specific to the RB. The RLC layer also provides three RLC modes, a Transparent Mode (TM), an Unacknowledged Mode (UM), and an Acknowledged Mode (AM), in order to support various QoS.

The PDCP layer is located above the RLC layer and can perform header compression on data transmitted using IP packets such as IPv4 or IPv6 packets. The PDCP layer is present only in a packet-switched domain and includes one PDCP entity per RB.

The RRC layer sets a variety of operating methods, parameters, and characteristics of channels associated with the first and second layers of the radio protocol in order to satisfy QoS. Specifically, the RRC layer determines which header compression method would be used at the PDCP layer and determines an operating mode, a RLC PDU size, and values of various protocol parameters which are used for the RLC layer.

DISCLOSURE OF THE INVENTION

Technical Problem

QoS is the quality of services transmitted and received through a wireless mobile communication system. Typical factors that affect QoS include delay, error ratio, and bitrate. QoS of a service is determined appropriately according to the type of the service.

In the case of real-time services such as VoIP or streaming services using a wireless mobile communication system, problems such as video interruption or audio distortion occur if transfer delay is significant. That is, even though data is received by the counterpart, the quality is lowered if it takes more than a specific time to transfer the data to the counterpart. Indeed, data received after a specific time has elapsed is mostly not used by an application. Accordingly, attempting to transmit a data block, whose transfer time has exceeded the allowed transfer time, or storing such a data block causes overhead and waste of resources.

The following is a more detailed description with reference to the PDCP layer. Data units received from the outside of the L2 layer are stored in a buffer of the PDCP layer. The data units are stored in the PDCP layer until they are received by the counterpart. However, if transmission of data blocks associated with a PDCP SDU is delayed at a lower layer, the time duration during which the PDCP SDU must stay in the buffer of the PDCP layer increases. Specifically, the capacity of the buffer may become insufficient if the amount of data is large, if data is constantly received from the outside, or if transmission of some PDCP SDUs is kept delayed. Especially, if the buffer is full, new data received from the outside is immediately discarded since there is no space in which to store the new data. This directly affects the QoS.

An object of the present invention devised to solve the above problems of the conventional technologies lies in providing a data processing method that guarantees Quality of Service (QoS) and efficiently manages data in a wireless mobile communication system which uses a multilayer structure.

Another object of the present invention devised to solve the problem lies in providing a method in which a specific protocol layer of a User Equipment (UE) or a base station decides data to be discarded (or deleted) and instructs a lower layer to discard the data.

A further object of the present invention devised to solve the problem lies in providing a method in which a lower layer discards data when a specific protocol layer of a UE or a base station has instructed the lower layer to discard the data.

Objects of the present invention are not limited to those described above and other objects will be clearly understood by those skilled in the art from the following description.

Technical Solution

In one aspect of the present invention, provided herein is a method of processing data by a user equipment in a wireless mobile communication system, the method including the steps of receiving a first data block from an upper layer; transferring a second data block including the first data block to a lower layer at a particular protocol layer; discarding the first and second data blocks present in the particular protocol layer if a certain period of time has passed; and transferring information associated with the discard of the second data block to the lower layer. Preferably, the upper layer is a RRC layer. Preferably, the lower layer is a RLC layer. Preferably, the specific protocol layer is a PDCP layer.

In another aspect of the present invention, provided herein is a method of processing data by a user equipment or a base station in a wireless mobile communication system, the method including the steps of operating a timer for a first data block at a particular protocol layer when receiving the first data block from an upper layer; transferring a second data block including the first data block to a lower layer at a particular protocol layer; discarding the first and second data blocks present in the particular protocol layer if the timer expires; and transferring information associated with the discard of the second data block to the lower layer. Preferably, the upper layer is a RRC layer. Preferably, the lower layer is a RLC layer. Preferably, the specific protocol layer is a PDCP layer.

In another aspect of the present invention, provided herein is a method of processing data by a user equipment or a base station in a wireless mobile communication system, the method including the steps of receiving a data block from an upper layer, receiving an instruction to discard the data block from the upper layer, and discarding the data block at a particular protocol layer if no part of the data block has been transmitted.

Advantageous Effects

Embodiments of the present invention have the following advantages.

First, it is possible to guarantee QoS and to efficiently manage data in a wireless mobile communication system which uses a multilayer structure.

Second, a specific protocol layer of a User Equipment (UE) or a base station can decide data to be discarded (or deleted) and instruct a lower layer to discard the data.

Third, a lower layer can discard data when a specific protocol layer of a UE or a base station has instructed the lower layer to discard the data.

Advantages of the present invention are not limited to those described above and other advantages will be clearly understood by those skilled in the art from the following description.

DESCRIPTION OF DRAWINGS

The accompanying drawings, which are included to provide a further understanding of the invention, illustrate embodiments of the invention and together with the description serve to explain the principle of the invention.

In the drawings:

FIG. 4 illustrates an example structure of a physical channel used in an E-UMTS system.

MODE FOR INVENTION

The above and other configurations, operations, and features of the present invention will be easily understood from the embodiments of the invention described below with reference to the accompanying drawings. The embodiments described below are examples wherein technical features of the invention are applied to an Evolved Universal Mobile Telecommunications System (E-UMTS).

Figure 1:
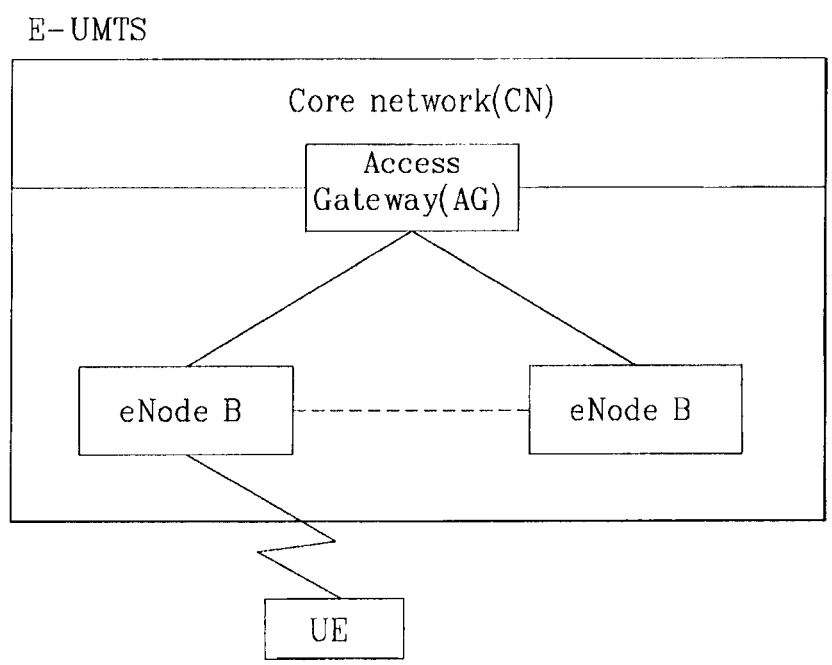
FIG. 1 illustrates a network structure of an E-UMTS.

FIG. 1 shows a network structure of the E-UMTS to which an embodiment of the present invention is applied. The E-UMTS system is an evolved version of the conventional WCDMA UMTS system and basic standardization thereof is in progress under the 3rd Generation Partnership Project (3GPP). The E-UMTS is also referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

As shown in FIG. 1, the E-UMTS mainly includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service, and/or a unicast service. AGs can be divided into AGs responsible for processing user traffic and AGs responsible for processing control traffic. Here, an AG for processing new user traffic and an AG for processing control traffic can communicate with each other using a new interface. One or more cells are present for one eNB. An interface for transmission of user traffic or control traffic can be used between eNBs. A Core Network (CN) may include an AG and network nodes for user registration of UEs. An interface for discriminating between the E-UTRAN and the CN can be used. The AG manages mobility of a UE on a Tracking Area (TA) basis. One TA includes a plurality of cells. When the UE has moved from a specific TA to another TA, the UE notifies the AG that the TA where the UE is located has been changed.

Figure 2:
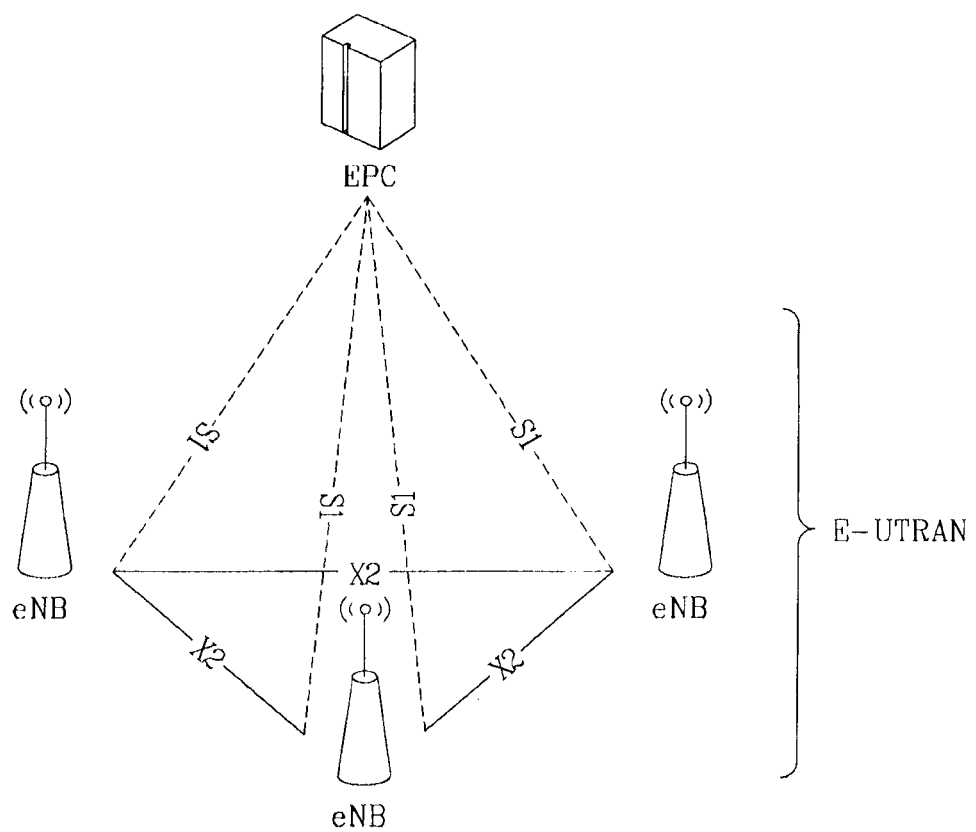
FIG. 2 illustrates a schematic structure of an Evolved Universal Terrestrial Radio Access Network (E-UTRAN).

FIG. 2 illustrates a network structure of an Evolved Universal Terrestrial Radio Access Network (E-UTRAN) system which is a mobile communication system to which the embodiment of the present invention is applied. The E-UTRAN system is an evolved version of the conventional UTRAN system. The E-UTRAN includes base stations (eNBs), which are connected through X2 interfaces. Each eNB is connected to User Equipments (UEs) through a radio interface and is connected to an Evolved Packet Core (EPC) through an S1 interface.

Figure 3A:
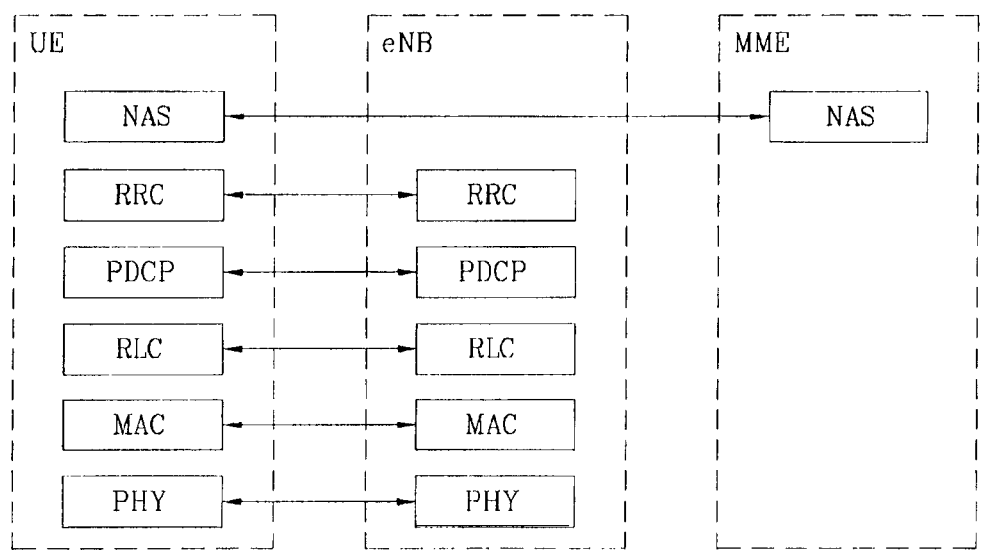
FIGS. 3A and 3B illustrate the configurations of a control plane and a user plane of a radio interface protocol between a UE and an E-UTRAN.
Figure 3B:
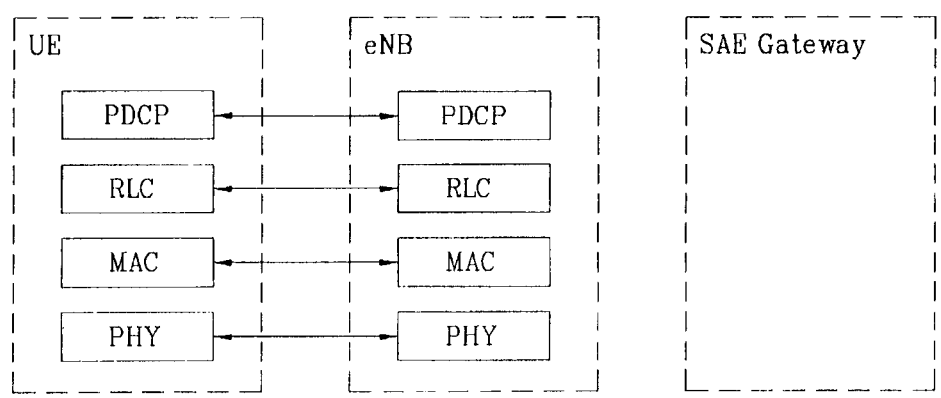

FIGS. 3A and 3B illustrate the configurations of control plane and a user plane of a radio interface protocol between a UE and a UMTS Terrestrial Ratio Access Network (UTRAN) based on the 3GPP radio access network standard. The radio interface protocol is divided horizontally into a physical layer, a data link layer, and a network layer and vertically into a user plane for data information transmission and a control plane for signaling.

The protocol layers of FIGS. 3A and 3B can be divided into a L1 layer (first layer), a L2 layer (second layer), and a L3 layer (third layer) based on the lower three layers of the Open System Interconnection (OSI) reference model widely known in communication systems.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the radio protocol control and user planes.

The physical layer, which is the first layer, provides an information transfer service to an upper layer using a physical channel. The physical layer is connected to a Media Access Control (MAC) layer, located above the physical layer, through a transport channel. Data is transferred between the MAC layer and the physical layer through the transport channel. Data transfer between different physical layers, specifically between the respective physical layers of transmitting and receiving sides, is performed through the physical channel. The physical channel is modulated according to the Orthogonal Frequency Division Multiplexing (OFDM) method, using time and frequencies as radio resources.

The MAC layer of the second layer provides a service to a Radio Link Control (RLC) layer, located above the MAC layer, through a logical channel. The RLC layer of the second layer supports reliable data transfer. The functions of the RLC layer may also be implemented through internal functional blocks of the MAC layer. In this case, the RLC layer need not be provided. A PDCP layer of the second layer performs a header compression function to reduce unnecessary control information in order to efficiently transmit IP packets such as IPv4 or IPv6 packets in a radio interval with a relatively narrow bandwidth.

A Radio Resource Control (RRC) layer located at the bottom of the third layer is defined only in the control plane and is responsible for control of logical, transport, and physical channels in association with configuration, re-configuration and release of Radio Bearers (RBs). The RB is a service that the second layer provides for data communication between the UE and the UTRAN. To accomplish this, the RRC layer of the UE and the RRC layer of the network exchange RRC messages. The UE is in a RRC connected mode if a RRC connection has been established between the RRC layer of the radio network and the RRC layer of the UE. Otherwise, the UE is in a RRC idle mode.

A Non-Access Stratum (NAS) layer located above the RRC layer performs functions such as session management and mobility management.

One cell of the eNB is set to provide a bandwidth such as 1.25, 2.5, 5, 10, or 20 MHz to provide a downlink or uplink transmission service to UEs. Here, different cells may be set to provide different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. User traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

FIG. 4 illustrates an example of a physical channel structure used in an E-UMTS system. A physical channel includes a plurality of subframes on the time axis and a plurality of subcarriers on the frequency axis. Here, one subframe includes a plurality of symbols on the time axis. One subframe includes a plurality of resource blocks and one resource block includes a plurality of symbols and a plurality of subcarriers. Each subframe can use specific subcarriers of a specific symbol (e.g., a first symbol) of the subframe for a Physical Downlink Control Channel (PDCCH) (i.e., a L1/L2 control channel). A L1/L2 control information transmission region and a data transmission region are shown in FIG. 4.

The Evolved Universal Mobile Telecommunications System (E-UMTS), which is currently under discussion, uses 10 ms radio frames, each including 10 subframes. Each subframe includes two consecutive slots, each of which is 0.5 ms long. One subframe includes multiple OFDM symbols. Some (for example, the first symbol) of the OFDM symbols can be used to transmit L1/L2 control information. A Transmission Time Interval (TTI), which is a unit time during which data is transmitted, is 1 ms.

The eNB and the UE transmit and receive most data other than a specific control signal or specific service data through a PDSCH which is a physical channel by using a DL-SCH which is a transport channel. Information indicating which PDSCH data is transmitted to a UE (one or a plurality of UEs) or how the UEs receive and decode PDSCH data is included in a PDSCH which is a physical channel, and then transmitted.

For example, let us assume that a specific PDCCH has been CRC-masked with a Radio Network Temporary Identity (RNTI) "A" and an information associated with data to be transmitted is transmitted through a specific subframe by using a radio resource (e.g., a frequency position) "B" and a transmit format information (e.g., transmit block size, modulation scheme, coding information, etc) "C". Under this assumption, one or more UEs in a cell monitor the PDCCH using their own RNTI information. And, if one or more specific UEs contain the RNTI "A", the specific UEs read the PDCCH and receive a PDSCH indicated by "B" and "C" in the received PDCCH information at a corresponding time.

Figure 5:
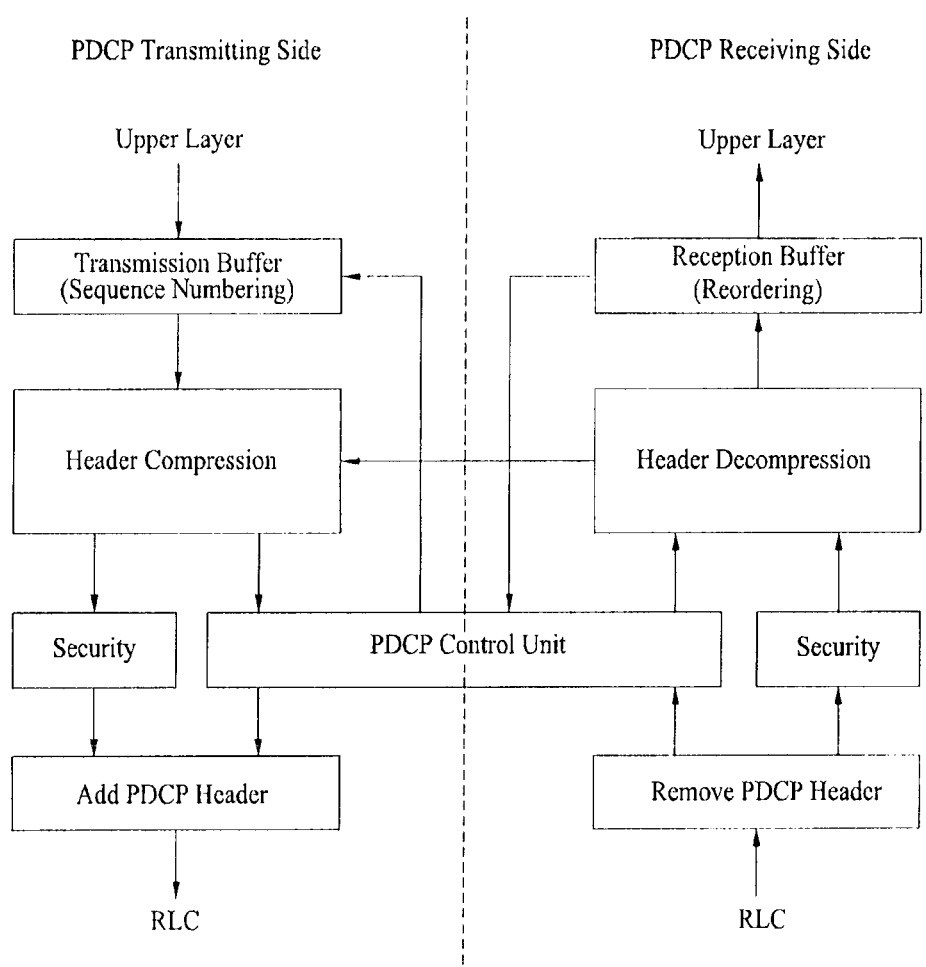
FIG. 5 is a block diagram of a PDCP layer used in an E-UMTS system.

FIG. 5 is a block diagram of a PDCP layer used in an E-UMTS system. This block diagram illustrates functional blocks that may differ from actual implementations. The PDCP layer is not limited to a specific implementation.

As shown in FIG. 5, the PDCP layer is located at the top of the L2 structure and is generally connected to a device such as a computer at an upper side of the PDCP layer and exchanges IP packets with the device. Accordingly, the PDCP layer is responsible for primarily storing IP packets received from the outside.

A PDCP entity is connected to a RRC or a user application at an upper side of the PDCP entity and is connected to a RLC layer at a lower side of the PDCP entity. Data which the PDCP entity exchanges with an upper layer is referred to as a "PDCP SDU".

One PDCP entity includes transmitting and receiving sides as shown in FIG. 5. The transmitting side of the PDCP entity shown at a left side of FIG. 5 constructs a PDU from a SDU received from an upper layer or from control information internally generated at the PDCP entity and transmits the PDU to a peer PDCP entity of a receiving side. The receiving side shown at the right side of FIG. 5 extracts a PDCP SDU or control information from a PDCP PDU received from a peer PDCP entity of a transmitting side.

As described above, PDUs generated at a PDCP entity of the transmitting side are divided into two types, data and control PDUs. The PDCP data PDU is a data block that the PDCP creates by processing a SDU received from an upper layer. The PDCP control is a data block that the PDCP internally creates to transfer a control information to a peer entity.

The PDCP data PDU is created at RBs of both a user plane and a control plane. However, some functions of the PDCP are selectively applied depending on which plane is used. That is, a header compression function is applied only to user plane data. An integrity protection function among security functions is applied only to control plane data. The security functions also include a ciphering function for data security. The ciphering function is applied to both user plane and control plane data.

The PDCP control PDU is generated only at the control plane RB. The PDCP control PDU is classified mainly into two types, one being associated with a PDCP status report for notifying the transmitting side of the status of a PDCP reception buffer, the other being associated with a Header Compression (HC) feedback packet for notifying a header compressor of the status of a header decompressor.

Figure 6:
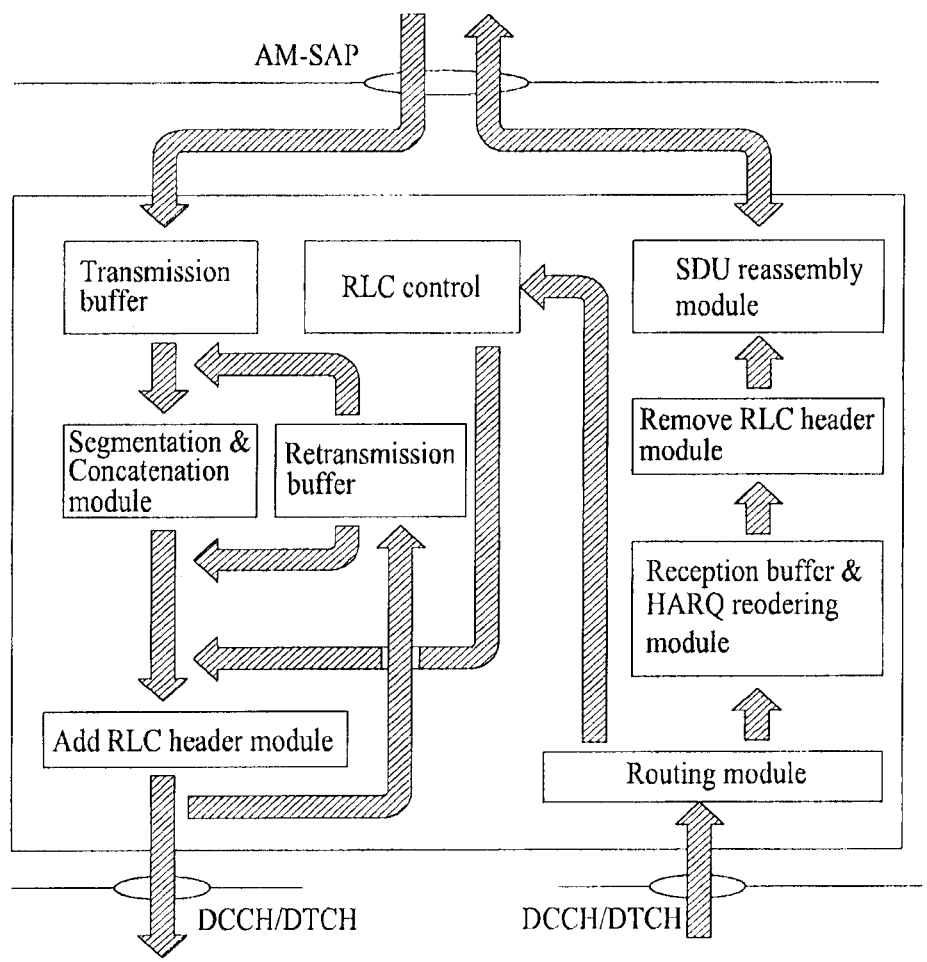
FIG. 6 is a block diagram of an AM entity of a RLC layer used in an E-UMTS system.

FIG. 6 is a block diagram of an AM entity of a RLC layer used in an E-UMTS system. This block diagram illustrates functional blocks that may differ from actual implementations. The RLC layer is not limited to a specific implementation.

Although the RLC layer has three modes, TM, UM and AM, TM and UM entities are not illustrated since the TM entity performs almost no function at the RLC layer and the UM entity is similar to the AM entity except that it has no retransmission function.

The UM RLC layer transmits each PDU to the receiving side by attaching a PDU header including a Sequence Number (SN) to the PDU to notify the receiving side of which PDU has been lost during transmission. Due to this function, at the user plane, the UM RLC is mainly responsible for transmitting broadcast/multicast data or transmitting real-time packet data such as voice (e.g., VoIP) or streaming data of a Packet Service (PS) domain. At the control plane, the UM RLC is responsible for transmitting a RRC message which does not require acknowledgement among RRC messages that would be transmitted to a specific UE or a specific UE group in a cell.

Similar to the UM RLC, the AM RLC constructs a PDU by attaching a PDU header including a SN when constructing the PDU. However, unlike the UM RLC, the receiving side acknowledges a PDU transmitted by the transmitting side at the AM RLC. The reason why the receiving side acknowledges each PDU transmitted by the transmitting side at the AM RLC is to request that the transmitting side should retransmit a PDU that the AM RLC has not received. This retransmission function is the most significant feature of the AM RLC. That is, the purpose of the AM RLC is to guarantee error-free data transmission through retransmission. Due to this purpose, the AM RLC is mainly responsible in the user plane for transmitting non-real-time packet data such as TCP/IP of the PS domain and is responsible in the control plane for transmitting a RRC message that must need reception acknowledgment responses among RRC messages transmitted to a specific UE in the cell.

In terms of directionality, the UM RLC and AM RLC differ in that the UM RLC is used for unidirectional communication whereas the AM RLC is used for bidirectional communication due to the presence of feedback from the receiving side. In terms of structural aspects, the UM RLC and AM RLC differ in that one UM RLC entity has either a transmission or reception structure whereas one AM RLC entity includes both transmitting and receiving sides.

The AM RLC is complicated due to the retransmission function. For managing retransmission, the AM RLC includes a retransmission buffer in addition to transmission/reception buffers and uses transmission/reception windows for flow control and performs a variety of functions as follows. The transmitting side performs polling to request that a receiving side of a peer reception provide status information. The receiving side provides a status report to report a buffer status of the receiving side to a peer RLC entity of a transmitting side. The receiving side constructs a status PDU carrying status information. To support these functions, the AM RLC requires a variety of protocol parameters, status variables and timers. PDUs used to control data transmission at the AM RLC such as a status report or status information are referred to as "control PDUs" and PDUs used to transfer user data are referred to as "data PDUs".

However, at the AM RLC, a RLC data PDU is specifically classified into an AMD PDU and an AMD PDU segment. Each AMD PDU segment includes part of data belonging to the AMD PDU. In the LTE, the maximum size of a data block that the UE transmits is changed at each transmission. Accordingly, when the AM RLC entity of the transmitting side receives a negative acknowledgement from an AM RLC entity of the receiving side after constructing and transmitting a 200-byte AMD PDU at a certain time, the 200-byte AMD PDU cannot be retransmitted by the AM RLC entity of the transmitting side without alteration if the maximum transmittable data block size is 100 bytes. Here, the AM RLC entity of the transmitting side uses AMD PDU segments which are small units into which the corresponding AMD PDU is divided. In this procedure, the AM RLC entity of the transmitting side divides the AMD PDU into AMD PDU segments and transmits the AMD PDU segments over a plurality of time intervals and the AM RLC entity of the receiving side reconstructs the received AMD PDU segments into an AMD PDU.

The functions of the RLC entity can be considered those of Segmentation and Reassembly (SAR) in their entirety. That is, the RLC of the transmitting site is responsible for adjusting the size of a MAC PDU indicated by a MAC entity, which is a lower entity, and RLC SDUs received from an upper entity. Specifically, the RLC transmitting side constructs a RLC PDU by segmenting and concatenating RLC SDUs received from an upper entity so as to match a MAC PDU size (i.e., a RLC PDU size) indicated by a lower entity. A header of a RLC PDU includes information associated with segmentation, concatenation or the like of RLC SDUs. Based on this information, the receiving side reconstructs RLC SDUs from received RLC PDUs.

An overall data transmission procedure performed at L2 is as follows. First, externally created data (e.g., an IP packet) is transferred to a PDCP entity and is then converted into a PDCP SDU. The PDCP entity stores the PDCP SDU in its own buffer until transmission is completed. The PDCP entity processes the PDCP SDU to create PDCP PDUs and transfers the created PDCP PDUs to the RLC entity. A data block that the RLC entity receives from an upper entity is a RLC SDU, which is identical to a PDCP PDU. The RLC entity performs appropriate processing on the RLC SDU and constructs and transmits a RLC PDU.

Example of General Operation of Protocol Layer According to Embodiment of the Invention An embodiment of the present invention suggests a method for effectively managing data while satisfying Quality of Service (QoS) of an established (or configured) Radio Bearer (RB). To accomplish this, the embodiment of the present invention decides whether or not to discard data stored in a protocol layer entity of the transmitting side taking into consideration an allowed transfer time or a maximum allowed delay of data and a maximum buffer size that can be accommodated by the protocol layer entity of the transmitting side. Preferably, the protocol layer is a PDCP layer. An exemplary general operation of the embodiment of the present invention is described in detail below focusing on the PDCP layer. Here, the term "discard" can be used interchangeably with similar terms such as "deletion", "delete", "abandon", "erase", "remove" and the like.

In an embodiment of the present invention, the PDCP entity can decide whether or not to discard a PDCP SDU when transmission of the PDCP SDU has been delayed for a predetermined time in order to guarantee QoS of an established RB. The predetermined time can be set flexibly taking into consideration the type of data to be transmitted. The predetermined time can be set by the network. Preferably, the predetermined time can be set by a layer (e.g., RRC layer) above the PDCP layer. If needed, the PDCP SDU and/or PDCP PDU may not be discarded even when the predetermined time has elapsed.

In an embodiment, the PDCP entity starts (in other terms, activates, runs or operates) a timer for a PDCP SDU when the PDCP SDU is received from an upper layer. Preferably, the upper layer is a Radio Resource Control (RRC) layer. The timer can run individually for each PDCP SDU. The timer can also run commonly for a specific number of PDCP SDUs or a specific group of PDCP SDUs. For example, when a specific number of related PDCP SDUs or a specific group of PDCP SDUs is present, the timer can run only for the first PDCP SDU.

When the RLC entity has notified the PDCP entity that the RLC SDU (i.e., PDCP PDU) has been successfully transmitted while the timer is running, the PDCP entity can discard the PDCP PDU. In an implementation, the PDCP entity can discard a PDCP PDU when PDCP PDUs with serial numbers lower than that of the PDCP PDU have been successfully transmitted. The PDCP entity can also discard a PDCP PDU when PDCP SDUs previous to a PDCP SDU associated with the PDCP PDU have been successfully transmitted. When the PDCP PDU has been discarded, a timer of the PDCP SDU associated with the PDCP PDU is stopped. Preferably, the PDCP SDU whose timer has been stopped is discarded.

When the timer expires while the PDCP entity has not received any notification of whether or not the PDCP PDU has been successfully transmitted from the RLC entity, the PDCP entity can decide to discard a PDCP SDU associated with the timer. The timer can be given a variety of names depending on its function. In an embodiment of the present invention, the timer can be referred to as a "discard_timer" since it is associated with discarding data of the PDCP layer.

In an implementation, the value of the timer can be set by the network. Preferably, the value of the timer can be set by a layer (e.g., RRC layer) above the PDCP layer. The value of the timer is a setting associated with the timer. For example, the value of the timer may indicate a PDCP SDU or a PDCP PDU, based on which the timer will run. The value of the timer can also indicate an operation performed at the PDCP layer, based on which the timer will run. The value of the timer may also include information associated with the time when the timer will expire after it is activated (i.e., information associated with the timer's expiration time). The timer's expiration time can be set taking into consideration all times associated with transmission of an IP packet (e.g., each duration the IP packet stays at the RLC entity and the PDCP entity, a transmission period, the maximum allowable delay of data, etc.).

In addition, the timer expiration time can be set flexibly according to data type since not all IP packets or PDCP PDUs have the same importance. For example, a full-header packet is essential to form a context of header compression. Accordingly, a different timer value can be set according to the characteristics or attributes of packets. A timer may not be activated or the expiration time thereof may be set to infinity for a specified packet or PDCP PDU/SDU. Alternatively, the discard process may not be performed for the specified packet or PDCP PDU/SDU even when the timer has expired.

When the PDCP entity has decided to discard a specific PDCP SDU and a PDCP PDU associated with the PDCP SDU has not been transferred to the RLC entity, the PDCP entity provides no notification to the RLC entity and discards the PDCP SDU. Preferably, the PDCP entity discards the PDCP PDU associated with the PDCP SDU together with the PDCP SDU.

When the PDCP entity has decided to discard a specific PDCP SDU and a PDCP PDU associated with the PDCP SDU has already been transferred to the RLC entity, the PDCP entity provides information associated with discard of the PDCP SDU and/or PDCP PDU to the RLC entity and discards the PDCP SDU. Preferably, the information associated with the discard may be information indicating that a certain PDCP PDU (i.e., RLC SDU) or PDCP SDU has been discarded. The information associated with the discard may also be information requesting that the associated RLC SDU should be discarded or information used to request that the associated RLC SDU should be discarded.

In the above procedure, when the PDCP SDU has been discarded, it is assumed that the associated PDCP PDU has been successfully transmitted and the successful transmission is reported to an upper layer.

In the above procedure, when the RLC entity receives the information associated with the discard of a specific PDCP SDU and/or PDCP PDU (i.e., RLC SDU) from the PDCP entity, the RLC entity performs an operation for discarding an associated RLC SDU.

The UM RLC entity discards the associated RLC SDU and no longer attempts to transmit a RLC PDU associated with the RLC SDU.

The AM RLC entity performs an operation for discarding the associated RLC SDU. Preferably, the operation includes an operation of a RLC entity of a transmitting side to notify a RLC entity of a receiving side of a command indicating that the RLC SDU will no longer be transmitted. In this case, the AMD RLC entity of the transmitting side can also notify the AM RLC entity of the receiving side of a serial number of a lower boundary of a reception RLC window or a transmission RLC window in association with the discarded RLC SDU. The AMD RLC entity of the transmitting side can notify the AM RLC entity of the receiving side of information associated with byte-offset together with the serial number.

Preferably, the RLC entity may discard the RLC SDU when no part of the RLC SDU indicated by the PDCP layer has been transmitted. For example, in the case where the RLC SDU is segmented into at least one segment, the RLC SDU may be discarded if no segment of the RLC SDU has been transmitted. The transmitting side can determine whether or not any part of the RLC SDU has been transmitted based on whether or not the transmitting side has actually transmitted any part of the RLC SDU. It does not matter whether or not the receiving side has actually received data. That is, the transmitting side determines whether or not the data has been transmitted, only from the viewpoint of the transmitting side.

Preferably, the transmitting side may determine whether or not any part of the RLC SDU has been transmitted based on whether or not any part of the RLC SDU has been mapped to a RLC PDU, preferably to a RLC data PDU. For example, when an upper layer has requested that a RLC SDU be discarded, the RLC SDU may be discarded only when no segment of the RLC SDU has been mapped to a RLC data PDU.

In addition, when the RLC SDU, which has been requested to be discarded by the upper layer, is constructed into at least one RLC PDU, the RLC SDU can be discarded only when no related RLC PDU has been transmitted. Further, the RLC SDU may not be discarded when the RLC SDU is included in specific RLC PDUs and it has been attempted to transmit at least one of the specific RLC PDUs through a wireless interface. The RLC SDU may also be discarded only when the RLC SDU is not included in any RLC PDU or when it has not been attempted to transmit any one of the specific RLC PDUs through a wireless interface although the RLC SDU is included in the specific RLC PDUs. Whether or not it has been attempted to transmit the RLC PDU through a wireless interface can be determined based on whether or not any part of the RLC SDU has been mapped to a RLC PDU, preferably to a RLC data PDU.

Although the above operations have been described mainly based on a PDCP SDU for ease of explanation, the operations may also be performed based on a PDCP PDU. Specifically, a timer may run in association with the PDCP PDU and associated operations may be performed accordingly.

Figure 7:
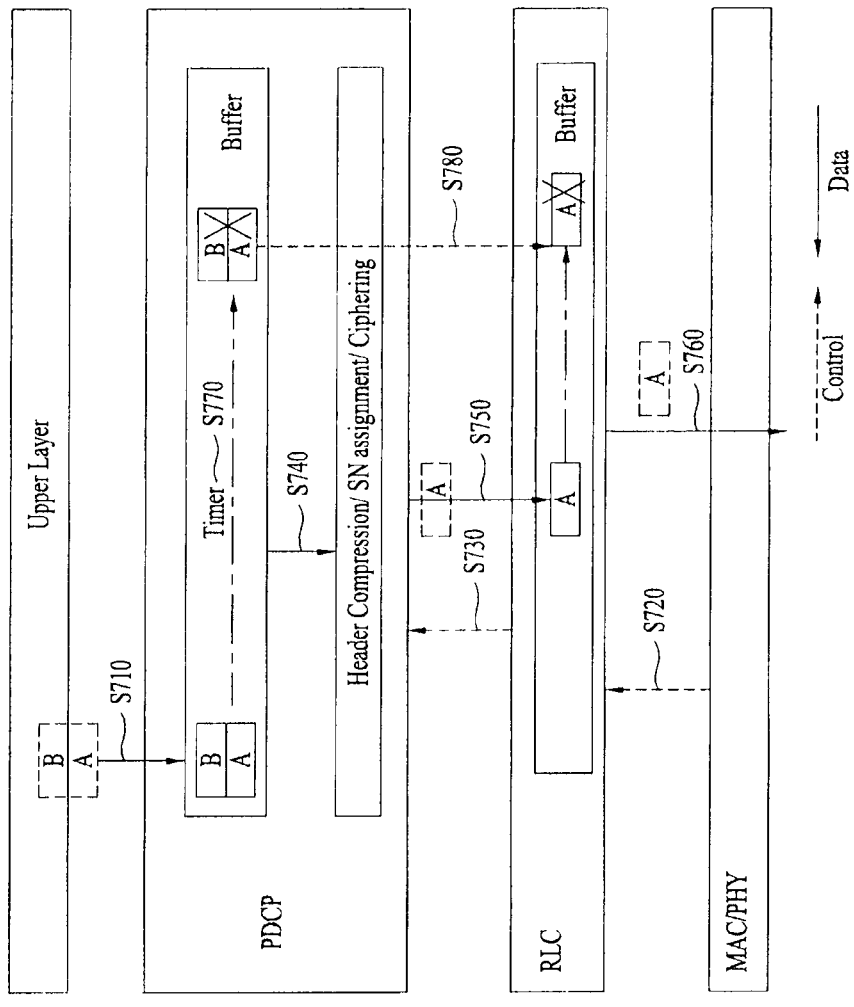
FIG. 7 illustrates example operations of a protocol layer performed at a UE or base station according to an embodiment of the present invention.

FIG. 7 illustrates exemplary operations of a protocol layer performed at a UE or base station according to an embodiment of the present invention.

As shown in FIG. 7, packets A and B are transferred from an upper layer to a PDCP layer (S710). PDCP SDUs of the packets A and B are stored in a PDCP buffer and a discard_timer starts for each of the packets (S770). A MAC layer requests that a RLC layer transfer new MAC SDUs (RLC PDUs) (S720). If the RLC layer has no new data to be transmitted, the RLC layer requests that a PDCP layer transfer new RLC SDUs (PDCP PDUs) (S730). The PDCP layer performs header compression, ciphering and header addition on the PDCP SDUs of the packet A to create PDCP PDUs of the packet A (S740). The PDCP layer transfers the PDCP PDUs of the packet A to the RLC layer (S750). The RLC layer stores the PDCP PDUs (i.e., RLC SDUs) of the packet A in a RLC buffer. The RLC layer constructs a RLC PDU from the received RLC SDU of the packet A and transfers the RLC PDU to the MAC layer. The MAC/PHY layers perform transmission of the RLC PDU (S760).

In FIG. 7, it is assumed that the PDCP layer has not received information, indicating that the receiving side has successfully received the PDCP PDU of the packet A, from the RLC layer until a discard_timer of the PDCP SDU for the packet A expires. It is also assumed that a discard_timer of the PDCP SDU for the packet B has expired almost at the same time.

Since the discard_timers for the packets A and B have expired, the PDCP layer decides to discard the packets A and B from the buffer (S770). Since the packet B has not yet been assigned a SN and has not been compressed or ciphered, the packet B is removed from the PDCP entity and the RLC entity is not notified that the packet B has been discarded.

On the other hand, since the packet A has been assigned a SN and has already been compressed and transferred to the RLC entity, the PDCP layer requests that the RLC layer should discard a RLC SDU associated with the packet A (S780). According to this notification, the RLC layer performs an operation for discarding the RLC SDU. The operation for discarding the RLC layer is described in more detail with reference to FIG. 8.

Figure 8:
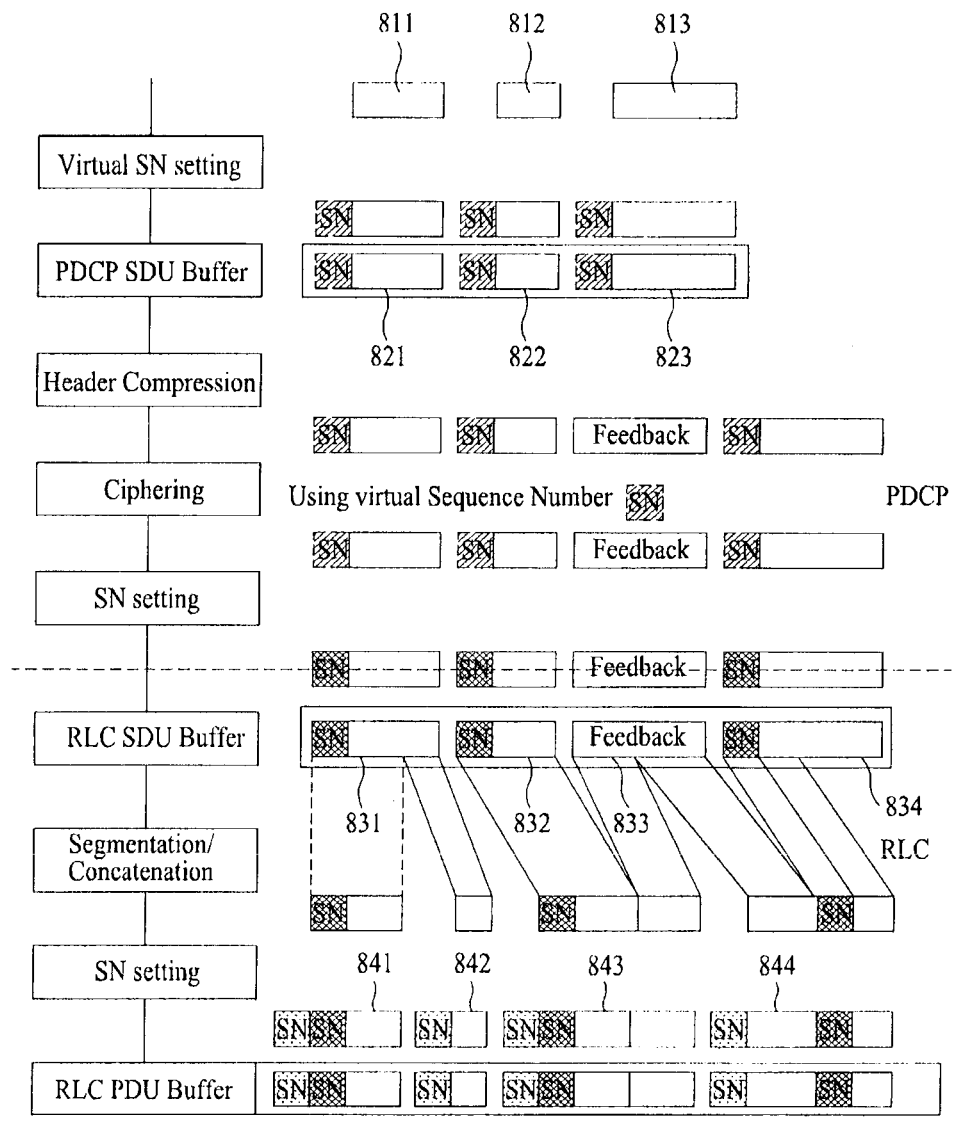
FIG. 8 illustrates example operations of a protocol layer performed at a UE or base station according to another embodiment of the present invention.

FIG. 8 illustrates exemplary operations of a protocol layer performed at a UE or base station according to another embodiment of the present invention.

As shown in FIG. 8, a PDCP layer receives data blocks such as IP packets from an upper layer (811-813). The PDCP layer adds a SN to each of the received blocks and stores the blocks in a PDCP SDU buffer (821-823). At a request of a lower layer, the PDCP layer constructs PDCP SDUs into PDCP data PDUs and transfers the PDCP data PDUs to the RLC layer (831, 832 and 834). In this case, the PDCP layer can also generates a PDCP control PDU (833) including feedback information or the like associated with header compression into. The RLC layer stores the received RLC SDUs in a RLC SDU buffer (831-834). At a request of a lower layer, the RLC layer may segment and concatenate the RLC SDUs to construct a plurality of RLC PDUs (841-844).

Although not illustrated in FIG. 8, when the PDCP layer receives a data block or stores data in the PDCP SDU buffer, a discard_timer is activated for each PDCP SDU, a specific number of PDCP SDUs or a specific group of PDCP SDUs. Alternatively, the discard_timer can run based on the PDCP PDU.

The procedure in which the PDCP layer decides whether or not to discard the PDCP SDU is similar to that of FIG. 7. The following is a description of exemplary operations of the PDCP layer in association with a PDCP control PDU according to another embodiment. Thereafter, the description will be given focusing on an operation of the RLC layer to discard a RLC SDU according to an instruction from the PDCP layer. The procedure of the RLC layer to discard the RLC SDU is applied to both the examples of FIGS. 7 and 8.

As shown in FIG. 8, PDCP data PDUs 831, 832, and 834 and a PDCP control PDU 833 are created in association with a PDCP SDU. In the example of FIG. 8, the PDCP control PDU 833 includes feedback information associated with header compression.

When the fact that the PDCP control PDU can be created in association with a PDCP SDU is taken into consideration, a PDCP control PDU associated with a specific PDCP SDU can be discarded when the specific PDCP SDU is discarded. For example, a PDCP data PDU is created immediately after header compression is performed on the specific PDCP SDU. In this case, a PDCP control PDU can also be created. Here, the PDCP control PDU and the PDCP data PDU can be discarded together since they are associated with the PDCP SDU. Preferably, when a PDCP control PDU has been generated, the PDCP control PDU is a discarded when a PDCP SDU generated simultaneously with the PDCP control PDU is discarded. Preferably, when a PDCP control PDU has been generated, the PDCP control PDU is discarded when a PDCP SDU generated immediately before the PDCP control PDU is discarded. Preferably, when a PDCP control PDU has been generated, the PDCP control PDU is discarded when a PDCP SDU generated next to the PDCP control PDU is discarded. Preferably, the PDCP control PDU includes a header compression packet.

In addition, when the fact that not all PDCP control PDUs are associated with a PDCP SDU is taken into consideration, the PDCP control PDU may not be discarded even when the specific PDCP SDU has been discarded. Preferably, when a PDCP control PDU has been generated, the PDCP control PDU is not discarded even when a PDCP SDU generated simultaneously with the PDCP control PDU is discarded. Preferably, when a PDCP control PDU has been generated, the PDCP control PDU is not discarded even when a PDCP SDU generated immediately before the PDCP control PDU is discarded. Preferably, when a PDCP control PDU has been generated, the PDCP control PDU is not discarded even when a PDCP SDU generated next to the PDCP control PDU is discarded. Preferably, the PDCP control PDU is a PDCP status report.

A separate timer can also run for a PDCP control PDU. Preferably, a separate timer starts for a PDCP control PDU when the PDCP control PDU is generated and the PDCP control PDU is discarded when the timer expires. Preferably, the same timer as that applied to a PDCP data PDU starts for a PDCP control PDU when the PDCP control PDU is generated and the PDCP control PDU is discarded when the timer expires. In this case, different timer values can be set for both the PDCP data PDU and the PDCP control PDU.

In the above procedure, when a PDCP control PDU has been discarded, the PDCP entity notifies the RLC layer that the PDCP control PDU has been discarded. That is, the PDCP entity determines data to be discarded to guarantee QoS and instructs the RLC entity below the PDCP entity to discard a corresponding RLC SDU. The following is a description of an exemplary procedure in which the RLC layer discards a specific RLC SDU when the PDCP layer has instructed the RLC layer to discard the RLC SDU.

As shown in FIG. 8, one RLC SDU may be divided into a plurality of RLC PDUs to be transmitted or one RLC PDU may include a plurality of RLC SDUs.

In the procedure for discarding specific RLC SDUs according to an instruction of the PDCP layer, removal of a RLC PDU including a plurality of RLC SDUs is wasteful if it is only necessary to discard some of the plurality of RLC SDUs included in the RLC PDU. In this case, the transmitting side of the AM RLC entity should not attempt to transmit RLC SDUs that were discarded according to the instruction of the PDCP layer and should attempt to retransmit other RLC SDUs until the RLC entity of the receiving side notifies the transmitting side of successful reception. To accomplish this, the transmitting side of the RLC entity may divide the RLC PDU (particularly, the AM RLC data PDU) to construct AM RLC data PDU segments that do not include the discarded RLC SDUs and then transmit the AM RLC data PDU segments to the receiving side. That is, when a RLC SDU has been discarded, the AM RLC data PDU segments including the discarded RLC SDU are no longer transmitted.

In the procedure for discarding specific RLC SDUs according to an instruction of the PDCP layer, the UM RLC entity discards all RLC PDUs including the RLC SDU and no longer transmits the discarded RLC PDUs. The UM RLC entity also discards the RLC SDU and no longer transmits associated RLC PDUs.

Preferably, even when the PDCP layer has instructed to discard a specific RLC SDU, the RLC SDU may be removed from the RLC buffer only when no part of the RLC SDU has been attempted to be transmitted or has been transmitted. That is, in the case where the RLC SDU has been divided into a plurality of segments, the RLC SDU can be removed from the RLC buffer only when no segment of the RLC SDU has been attempted to be transmitted or has been transmitted. For example, the RLC SDU may be removed from the RLC buffer only when no segment of the RLC SDU has been mapped to a RLC data PDU.

According to the embodiments of the present invention, it is possible to satisfy QoS of an established radio bearer and to effectively manage data in multiple protocol layers.

The above embodiments are provided by combining components and features of the present invention in specific forms. The components or features of the present invention should be considered optional if not explicitly stated otherwise. The components or features may be implemented without being combined with other components or features. The embodiments of the present invention may also be provided by combining some of the components and/or features. The order of the operations described above in the embodiments of the present invention may be changed. Some components or features of one embodiment may be included in another embodiment or may be replaced with corresponding components or features of another embodiment. It will be apparent that claims which are not explicitly dependent on each other can be combined to provide an embodiment or new claims can be added through amendment after this application is filed.

The above embodiments of the present invention have been described focusing mainly on the data communication relationship between a UE (or terminal) and a Base Station (BS). Specific operations which have been described as being performed by the BS may also be performed by upper nodes as needed. That is, it will be apparent to those skilled in the art that the BS or any other network node may perform various operations for communication with terminals in a network including a number of network nodes including BSs. The term "base station (BS)" may be replaced with another term such as "fixed station", "Node B", "eNode B (eNB)", or "access point". The term "terminal" may also be replaced with another term such as "user equipment (UE)", "mobile station (MS)", "mobile station (MS)", or "mobile subscriber station (MSS)".

The embodiments of the present invention can be implemented by hardware, firmware, software, or any combination thereof. In the case where the present invention is implemented by hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case where the present invention is implemented by firmware or software, the embodiments of the present invention may be implemented in the form of modules, processes, functions, or the like which perform the features or operations described above. Software code can be stored in a memory unit so that it can be executed by a processor. The memory unit may be located inside or outside the processor and can communicate data with the processor through a variety of known means.

INDUSTRIAL APPLICABILITY

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention.

What is claimed is:

1. A method of processing data at a transmitting end in a wireless mobile communication system, the method comprising the steps of:

receiving at a Packet Data Convergence Protocol (PDCP) layer of a transmitting end a first data block from an upper layer of the transmitting end;

generating a second data block including the first data block at the PDCP layer of the transmitting end;

discarding the first data block present in the PDCP layer of the transmitting end if a certain period of time has passed; and indicating, from the PDCP layer, layer of the transmitting end, a Radio Link Control (RLC) layer of the transmitting end to discard a corresponding RLC data block if the second data block has already been transferred from the PDCP layer of the transmitting end to the RLC layer of the transmitting end.

2. The method of claim 1, wherein the first data block present in the PDCP layer is discarded if a timer expires, wherein the timer is operated when receiving the first data block from the upper layer.

3. The method of claim 1, wherein the first data block is a PDCP Service Data Unit (PDCP SDU).

4. The method of claim 1, wherein the second data block is a PDCP Protocol Data Unit (PDCP PDU).

5. The method of claim 1, wherein the upper layer is a Radio Resource Control (RRC) layer.

6. The method of claim 1, wherein the RLC layer operates in an Acknowledged Mode (AM) or an Unacknowledged Mode (UM).

7. The method of claim 1, wherein the certain period of time is indicated by a network or by an upper layer above the PDCP layer.

8. The method of claim 2, wherein a value of the timer is indicated by a network or by an upper layer above the PDCP layer.

9. An apparatus for use in a wireless mobile communication system, the apparatus comprising:
an upper entity;
a Packet Data Convergence Protocol (PDCP) entity placed below the upper entity; and
a Radio Link Control (RLC) entity placed below the PDCP entity,
wherein the PDCP entity is configured:
to receive a first data block from the upper entity;
to generate a second data block including the first data block at the PDCP entity; and
to discard the first data block present in the PDCP entity if a certain period of time has passed,
to indicate, from the PDCP entity, the RLC entity to discard a corresponding lower layer RLC data block if the second data block has already been transferred from the layer PDCP entity to the RLC entity.

10. The apparatus of claim 9, wherein the first data block present in the PDCP entity is discarded if a timer expires, wherein the timer is operated when receiving the first data block from the upper layer.

11. The apparatus of claim 9, wherein the first data block is a PDCP Service Data Unit (PDCP SDU).

12. The apparatus of claim 9, wherein the second data block is a PDCP Protocol Data Unit (PDCP PDU).

13. The apparatus of claim 9, wherein the upper layer is a Radio Resource Control (RRC) layer.

14. The apparatus of claim 9, wherein the RLC layer operates in an Acknowledged Mode (AM) or an Unacknowledged Mode (UM).

15. The apparatus of claim 9, wherein the certain period of time is indicated by a network or by an upper layer above the PDCP entity.

16. The apparatus of claim 10, wherein a value of the timer is indicated by a network or by an upper layer above the PDCP entity.

* * * * *